United States Patent
Ohashi

(10) Patent No.: US 11,420,672 B2
(45) Date of Patent: Aug. 23, 2022

(54) POWER CONVERSION DEVICE, MOTOR DRIVE UNIT, AND ELECTRIC POWER STEERING DEVICE

(71) Applicant: Nidec Corporation, Kyoto (JP)

(72) Inventor: Hiromitsu Ohashi, Kyoto (JP)

(73) Assignee: NIDEC CORPORATION, Kyoto (JP)

( * ) Notice: Subject to any disclaimer, the term of this patent is extended or adjusted under 35 U.S.C. 154(b) by 697 days.

(21) Appl. No.: 16/292,483

(22) Filed: Mar. 5, 2019

(65) Prior Publication Data

US 2019/0315388 A1 Oct. 17, 2019

Related U.S. Application Data

(63) Continuation of application No. PCT/JP2017/031882, filed on Sep. 5, 2017.

(30) Foreign Application Priority Data

Sep. 26, 2016 (JP) .............................. JP2016-186759

(51) Int. Cl.
  *B62D 5/00* (2006.01)
  *B62D 5/04* (2006.01)
  *H02M 7/5395* (2006.01)

(52) U.S. Cl.
  CPC .......... *B62D 5/046* (2013.01); *H02M 7/5395* (2013.01)

(58) Field of Classification Search
  CPC ...... B62D 5/046; H02M 7/5395; H02M 7/48; H02P 27/06
  See application file for complete search history.

(56) References Cited

U.S. PATENT DOCUMENTS

| 8,743,573 B2 | 6/2014 | Balpe | |
|---|---|---|---|
| 2003/0067278 A1* | 4/2003 | Nakamura | H02J 7/1438 318/400.04 |
| 2017/0133958 A1* | 5/2017 | Hoshino | H02P 6/10 |
| 2020/0247462 A1* | 8/2020 | Akutsu | B62D 5/0403 |

FOREIGN PATENT DOCUMENTS

| CN | 102939714 A | 2/2013 |
|---|---|---|
| JP | 07-99959 B2 | 10/1995 |
| JP | 2014-054094 A | 3/2014 |
| JP | 2014-192950 A | 10/2014 |
| WO | 2012/098585 A1 | 7/2012 |

OTHER PUBLICATIONS

Machine translation of JP2014054094A.*
Machine translation of JPH0799959B2.*
Official Communication issued in International Patent Application No. PCT/JP2017/031882, dated Nov. 7, 2017.

* cited by examiner

*Primary Examiner* — Tyler J Lee
*Assistant Examiner* — Yufeng Zhang
(74) *Attorney, Agent, or Firm* — Keating & Bennett

(57) ABSTRACT

A power conversion device includes a first converter connected to first ends of windings of each phase of a motor, a second converter connected to second ends of the windings of each phase, and a switching circuit used to define a neutral point in the windings of each phase on the first inverter side. At least one of a plurality of switches included in the first inverter has a first current capacity, and a plurality of switches included in the second inverter have a second current capacity that is greater than the first current capacity.

14 Claims, 10 Drawing Sheets

POWER CONVERSION DEVICE, MOTOR DRIVE UNIT, AND ELECTRIC POWER STEERING DEVICE

CROSS REFERENCE TO RELATED APPLICATIONS

This application claims the benefit of priority to Japanese Patent Application No. 2016-186759 filed on Sep. 26, 2016 and is a Continuation Application of PCT Application No. PCT/JP2017/031882 filed on Sep. 5, 2017. The entire contents of each application are hereby incorporated herein by reference.

BACKGROUND OF THE INVENTION

1. Field of the Invention

The present disclosure relates to a power conversion device, a motor driver, and an electric power steering device in which power supplied to an electric motor is converted.

2. Description of the Related Art

Generally, electric motors such as a brushless DC motor and an AC synchronous motor (hereinafter simply referred to as "motors") are driven by three-phase currents. A complex control technique such as vector control is used in order to accurately control waveforms of the three-phase currents. In such a control technique, an advanced mathematical operation is required, and a digital arithmetic circuit such as a microcontroller (microcomputer) is used. A vector control technique is utilized in fields in which load fluctuation of a motor is large, such as a washing machine, an electric assist bicycle, an electric scooter, an electric power steering device, an electric vehicle, and industrial equipment. On the other hand, in a motor whose output is relatively small, another motor control method such as a pulse width modulation (PWM) method is adopted.

In the automotive field, an automobile electronic control unit (ECU) is used in vehicles. The ECU has a microcontroller, a power supply, an input/output circuit, an AD converter, a load drive circuit, a read only memory, and the like. An electronic control system is built with the ECU as the core. For example, the ECU processes a signal from a sensor to control an actuator such as a motor. Specifically, the ECU controls an inverter in a power conversion device while monitoring the rotational speed and the torque of the motor. Under the control of the ECU, the power conversion device converts drive power supplied to the motor.

In recent years, an electromechanically integrated motor (referred to as "power pack" in the present specification) in which a motor, a power conversion device, and an ECU are integrated has been developed. Especially in the automotive field, high quality assurance is required from the viewpoint of safety. Therefore, a redundant design capable of keeping safe operation is adopted even in a case in which some parts have failed. As an example of a redundant design, installing two power conversion devices for one motor is considered. As another example, installing a backup microcontroller in a main microcontroller is considered.

SUMMARY OF THE INVENTION

In the above-described prior art, further improvement in current control by the power conversion device has been required.

Example embodiments of the present disclosure provide a power conversion device capable of performing suitable current control over a wide range from low speed driving to high speed driving.

An exemplary power conversion device of the present disclosure converts power from a power supply to power to be supplied to a motor having n-phase windings, where n is an integer of 3 or greater, and includes a first inverter connected to first ends of windings of each phase of the motor, a second inverter connected to second ends of the windings of each phase, and a switching circuit used to define a neutral point in the windings of each phase on the first inverter side, wherein at least one of a plurality of switches included in the first inverter has a first current capacity, and a plurality of switches included in the second inverter have a second current capacity that is greater than the first current capacity.

The above and other elements, features, steps, characteristics and advantages of the present disclosure will become more apparent from the following detailed description of the preferred embodiments with reference to the attached drawings.

DETAILED DESCRIPTION OF THE PREFERRED EMBODIMENTS

Before describing the preferred embodiments of the present disclosure, the knowledge of the present inventor, which forms the basis of the present disclosure, will be described.

In a conventional power conversion device, a power supply and GND and each of two inverters are kept connected at all times. In view of this configuration, it is not possible to disconnect the power supply and the inverter. The inventor of the present application found a problem in that an inverter having a neutral point draws current from a power supply. As a result, power loss occurs.

As with the power supply, it is not possible to disconnect the inverter and the GND. The inventor of the present application found a problem in that a current supplied to windings of each phase through one inverter not having a neutral point flows to the GND from the other inverter without returning to the inverter of a supply source thereof. In other words, the inventor found a problem in that a closed loop of a drive current is not formed. It is desirable that a current supplied from one inverter to windings of each phase flows to the GND through the inverter of the supply source thereof.

Hereinafter, a power conversion device, motor drive unit, and electric power steering device of the present disclosure will be described with reference to the accompanying drawings. However, to avoid unnecessary redundancy of the following description and to facilitate understanding by those of ordinary skill in the art, more detailed description than necessary may be omitted in some cases. For example, detailed descriptions of already well-known matters or redundant description of substantially the same configuration may be omitted in some cases.

In the present specification, an embodiment of the present disclosure will be described with an example of a power conversion device that converts power to be supplied to a three-phase motor having three phase (U-phase, V-phase, and W-phase) windings. However, a power conversion device that converts power to be supplied to an n-phase motor having n-phase windings (where n is an integer of 4 or greater) such as four-phase or five-phase windings is also within the scope of the present disclosure.

Figure 1:
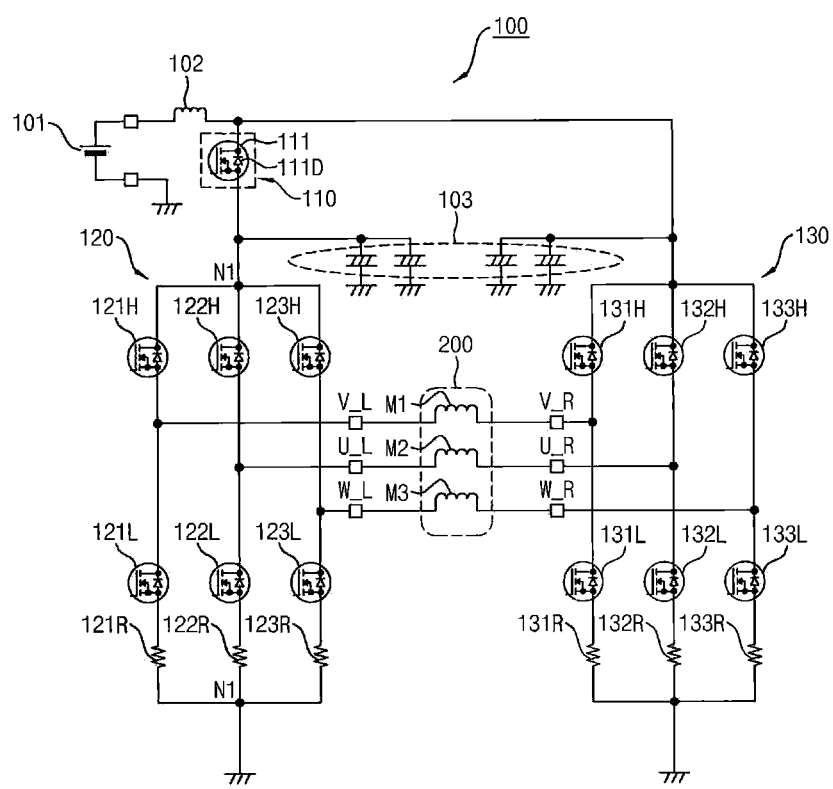
FIG. 1 is a circuit diagram illustrating a circuit configuration of a power conversion device 100 according to a first preferred embodiment of the present invention.

FIG. 1 schematically illustrates a circuit configuration of a power conversion device 100 according to the present preferred embodiment.

The power conversion device 100 has a switching circuit 110, a first inverter 120, and a second inverter 130. The power conversion device 100 may convert power to be supplied to various motors. A motor 200 is, for example, a three-phase AC motor. In the present specification, a left inverter in the drawings is referred to as a first inverter 120, and a right inverter in the drawings is referred to as a second inverter 130. Of course, the relationship may be reversed.

The motor 200 has a U-phase winding M1, a V-phase winding M2, and a W-phase winding M3, and is connected to the first inverter 120 and the second inverter 130. Specifically, the first inverter 120 is connected to one end of the windings of each phase of the motor 200, and the second inverter 130 is connected to the other end of the windings of each phase. In the present specification, "connection" between parts (elements) mostly refers to electrical connection. The first inverter 120 has terminals U_L, V_L, and W_L corresponding to each phase, and the second inverter 130 has terminals U_R, V_R, and W_R corresponding to each phase.

The terminal U_L of the first inverter 120 is connected to one end of the U-phase winding M1, the terminal V_L is connected to one end of the V-phase winding M2, and the terminal W_L is connected to one end of the W-phase winding M3. As with the first inverter 120, the terminal U_R of the second inverter 130 is connected to the other end of the U-phase winding M1, the terminal V_R is connected to the other end of the V-phase winding M2, and the terminal W_R is connected to the other end of the W-phase winding M3. Such connections with the motor are different from the so-called star connection and delta connection.

The switching circuit 110 has a first switch element 111. In the present specification, the switching circuit 110 disposed on a power supply 101 side may be referred to as "power-supply-side switching circuit" in some cases. The switching circuit 110 switches between whether the first inverter 120 and the power supply 101 are connected or disconnected. As will be described in detail below, the switching circuit 110 is used to configure neutral point of the windings of each phase at the first inverter 120 side.

The on and off of the first switching element 111 of the switching circuit 110 may be controlled by, for example, a microcontroller or a dedicated driver. As the first switch element 111, for example, a transistor such as a field effect transistor (typically a MOSFET) or an insulated gate bipolar transistor (IGBT) may be widely used, or a mechanical relay may be used. Hereinafter, an example in which an FET is used as the switch element of the switching circuit 110 will be described. For example, the first switch element 111 is referred to as an FET 111.

The FET 111 has a freewheeling diode 111D, and the freewheeling diode 111D is disposed so that the freewheeling diode 111D faces the power supply 101. More specifically, the FET 111 is disposed so that a forward current of the freewheeling diode 111D flows toward the power supply 101.

Embodiments are not limited to the illustrated example, and the number of switch elements used is appropriately determined in consideration of design specifications and the like. Especially in the automotive field, high quality assurance is required from the viewpoint of safety. Therefore, it is desirable that the switching circuit 110 has a plurality of switch elements.

Figure 2:
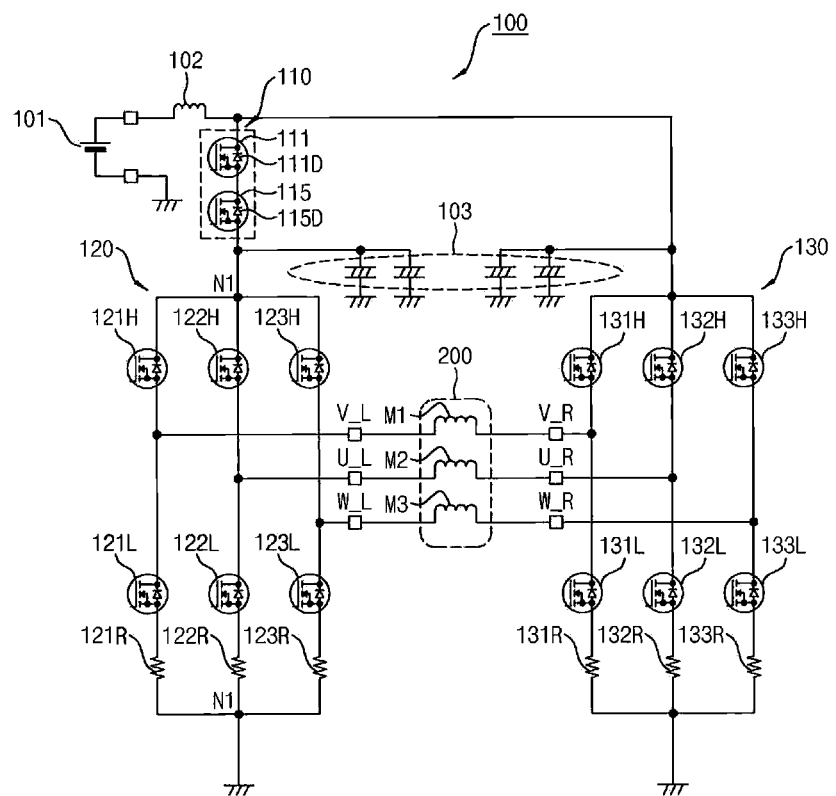
FIG. 2 is a circuit diagram illustrating another circuit configuration of the power conversion device 100 according to the first preferred embodiment of the present invention.

FIG. 2 schematically illustrates another circuit configuration of the power conversion device 100 according to the present preferred embodiment.

The switching circuit 110 may further include a switch element (FET) 115 for reverse connection protection. The FET 115 has a freewheeling diode 115D and is disposed so that the directions of the freewheeling diodes in the FETs are opposite to each other. Specifically, the FET 111 is disposed so that a forward current flows in the freewheeling diode 111D toward the power supply 101, and the FET 115 is disposed so that a forward current flows in the freewheeling diode 115D toward the first inverter 120. Even in a case in which the power supply 101 is connected in the reverse direction, a reverse current may be interrupted by the FET for reverse connection protection.

Refer back to FIG. 1.

The power supply 101 generates a predetermined power supply voltage. As the power supply 101, for example, a DC power supply is used. However, the power supply 101 may also be an AC-DC converter, a DC-DC converter, or a battery (rechargeable battery).

The power supply 101 may be a single power supply common to the first and second inverters 120 and 130, or may have a first power supply for the first inverter 120 and a second power supply for the second inverter 130.

A coil 102 is installed between the power supply 101 and each inverter. The coil 102 serves as a noise filter and smoothens high frequency noise included in a voltage waveform supplied to each inverter or high frequency noise generated by each inverter so that outflow of the high frequency noise to the power supply 101 side is prevented. A condenser 103 is connected to a power supply terminal of each inverter. The condenser 103 is a so-called bypass condenser and suppresses voltage ripple. The condenser 103 is, for example, an electrolytic condenser, and the capacity of the condenser 103 and the number of condensers 103 used are appropriately determined according to design specifications and the like.

The first inverter 120 (which is referred to as "bridge circuit L" in some cases) has a bridge circuit configured of three legs. Each leg has a low side switching element and a high side switching element. Switching elements 121L, 122L, and 123L illustrated in FIG. 1 are low side switching elements, and switching elements 121H, 122H, and 123H are high side switching elements. As the switching elements, for example, FETs or IGBTs may be used. Hereinafter, an example in which FETs are used as the switching elements will be described, and the switching elements are referred to as FETs in some cases. For example, the switching elements 121L, 122L, and 123L are referred to as FETs 121L, 122L, and 123L.

The first inverter 120 has three shunt resistors 121R, 122R, and 123R as current sensors (see FIG. 3) for detecting a current flowing through the windings of each phase of the U-phase, V-phase, and W-phase. A current sensor 150 has a current detection circuit (not illustrated) configured to detect a current flowing through each shunt resistor. For example, the shunt resistors 121R, 122R, and 123R are connected between the GND and the three low side switching elements included in the three legs of the first inverter 120. Specifically, the shunt resistor 121R is electrically connected between the FET 121L and the GND, the shunt resistor 122R is electrically connected between the FET 122L and the GND, and the shunt resistor 123R is electrically connected between the FET 123L and the GND. A resistance value of the shunt resistor is, for example, about 0.5 mΩ to 1.0 mΩ.

As with the first inverter 120, the second inverter 130 (which is referred to as "bridge circuit R" in some cases) has a bridge circuit configured of three legs. FETs 131L, 132L, and 133L illustrated in FIG. 1 are low side switching elements, and FETs 131H, 132H, and 133H are high side switching elements. The second inverter 130 has three shunt resistors 131R, 132R, and 133R. The shunt resistors are connected between the GND and the three low side switching elements included in the three legs. For example, each FET of the first and second inverters 120 and 130 may be controlled by a microcontroller or a dedicated driver. However, the connection example of the shunt resistors is not limited thereto. For example, the three shunt resistors 131R, 132R, and 133R may be disposed between the FET 111 and the FETs 121H, 122H, and 123H. Also, the number of shunt resistors for each inverter is not limited to three. For example, two shunt resistors 121R and 122R are used for the first inverter 120. The number of shunt resistors used and the arrangement of shunt resistors are appropriately determined in consideration of product cost and design specifications.

In the present preferred embodiment, all of the switching elements 131H, 132H, 133H, 131L, 132L, and 133L in the second inverter 130 are FETs having a second current capacity. The switching elements 121H, 122H, and 123H in the first inverter 120 are FETs having the second current capacity. A current capacity of high side switching elements at the side of the first inverter 120 at which the switching circuit 110 is disposed is set to be the second current capacity which is the same as that of the second inverter 130. The switching elements 121L, 122L, and 123L in the first inverter 120 are FETs having a first current capacity. The second current capacity is greater than the first current capacity. For example, the first current capacity may be set to be about 50 A, and the second current capacity may be set to be about 100 A. For example, a ratio of the first current capacity to the second current capacity is about ½. Here, the current capacity is one parameter indicating performance of the FET and refers to the maximum value of a drain current Ids. Generally, as the current capacity increases, the element size of the FET increases and the cost of the FET increases.

Figure 3:
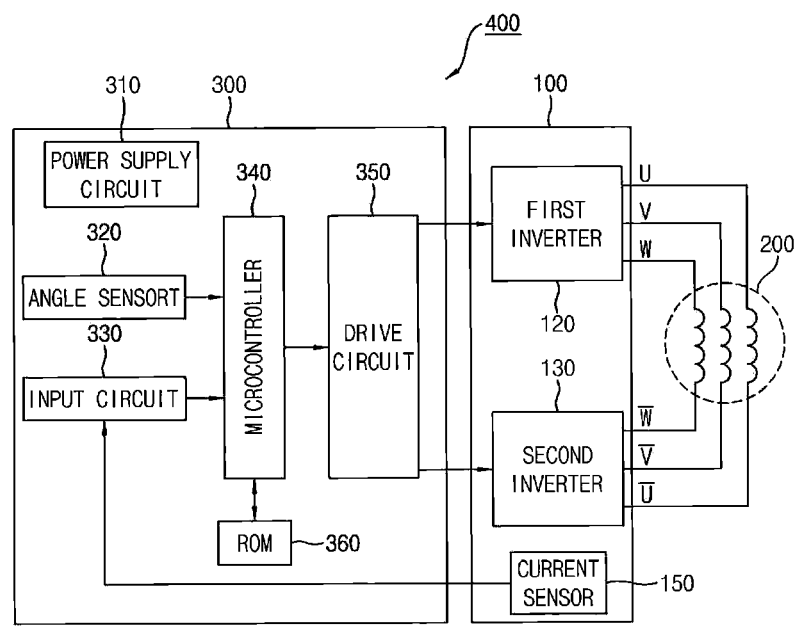
FIG. 3 is a block diagram illustrating a typical block configuration of a motor driver 400 including the power conversion device 100.

FIG. 3 schematically illustrates a typical block configuration of a motor drive unit 400 having the power conversion device 100.

The motor drive unit 400 has the power conversion device 100, the motor 200, and a control circuit 300.

The control circuit 300 has, for example, a power supply circuit 310, an angle sensor 320, an input circuit 330, a microcontroller 340, a drive circuit 350, and a ROM 360. The control circuit 300 is connected to the power conversion device 100 and controls the power conversion device 100, thereby driving the motor 200. For example, the control circuit 300 may realize closed loop control by controlling a target motor torque and rotational speed.

The power supply circuit 310 generates a DC voltage (for example, 3V or 5V) required for each block in the circuit. The angle sensor 320 is, for example, a resolver or a Hall IC. The angle sensor 320 detects an angle of rotation (hereinafter referred to as "rotation signal") of a rotor of the motor 200 and outputs the rotation signal to the microcontroller 340. The input circuit 330 receives a motor current value (hereinafter referred to as "actual current value") detected by the current sensor 150, converts a level of the actual current value to an input level of the microcontroller 340 as necessary, and outputs the actual current value to the microcontroller 340.

The microcontroller 340 controls a switching operation (turn-on or turn-off) of each FET in the first and second inverters 120 and 130 of the power conversion device 100. The microcontroller 340 sets a target current value according to the actual current value, the rotation signal of the rotor, and the like, generates a PWM signal, and outputs the generated PWM signal to the drive circuit 350. The microcontroller 340 may control on or off of the FET 111 in the switching circuit 110 of the power conversion device 100.

The drive circuit 350 is typically a gate driver. The drive circuit 350 generates a control signal (gate control signal) for controlling the switching operation of each FET in the first and second inverters 120 and 130 according to the PWM signal and supplies the control signal to the gate of each FET. Further, the drive circuit 350 may generate a gate control signal for controlling on or off of the FET 111 in the switching circuit 110 according to an instruction from the microcontroller 340 and may supply the control signal to the gate of the FET 111. However, the microcontroller 340 may have the function of the drive circuit 350. In that case, the control circuit 300 may not have the drive circuit 350.

The ROM 360 is, for example, a writable memory (for example, PROM), a rewritable memory (for example, flash memory), or a ROM. The ROM 360 stores a control program including an instruction group for causing the microcontroller 340 to control the power conversion device 100. For example, the control program is temporarily expanded in a random access memory (RAM, not illustrated) at the time of booting.

Hereinafter, a specific example of the operation of the motor drive unit 400 will be described, and a specific example of the operation of the power conversion device 100 will be mainly described.

The power conversion device 100 has power conversion modes including the first and second operation modes. Specifically, when the motor 200 is driven at a low speed, the power conversion device 100 converts power in the first operation mode. On the other hand, when the motor is driven at a high speed, the power conversion device 100 converts power in the second operation mode. In other words, the first operation mode is a mode corresponding to low speed driving of the motor 200, and the second operation mode is a mode corresponding to high speed driving of the motor 200.

Figure 4:
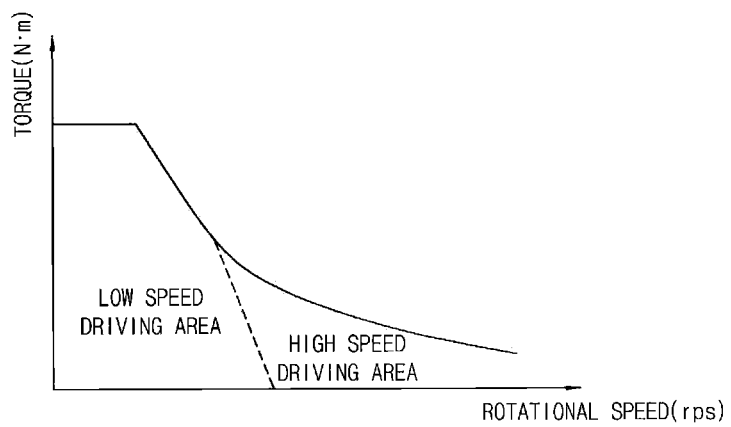
FIG. 4 is a graph illustrating the relationship between the number of rotations N (rps) per unit time and the torque T(N□m) of a motor.

FIG. 4 illustrates the relationship between the rotational speed (rps) per unit time and the torque T(N□m) of the motor. FIG. 4 illustrates a so-called T-N curve. The low speed driving and high speed driving areas are generally represented as the areas shown.

Figure 5:
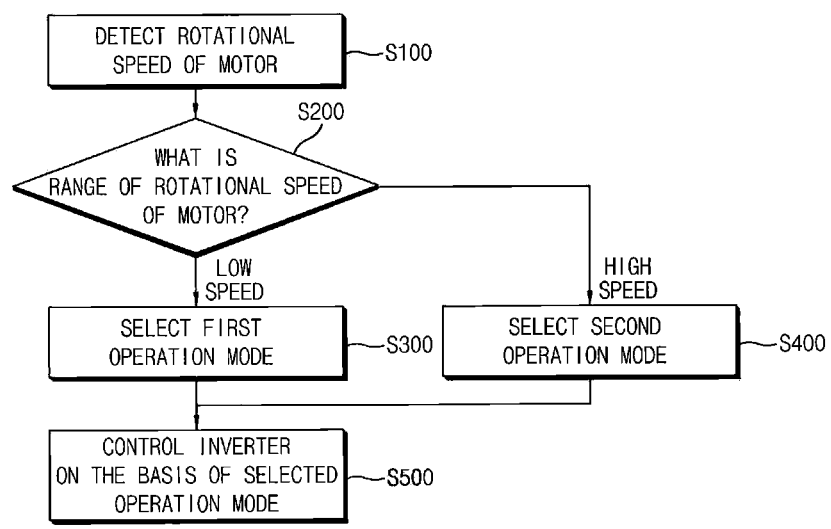
FIG. 5 is a flowchart illustrating an example of a process procedure of an operation of the power conversion device 100 according to the first preferred embodiment of the present invention.

FIG. 5 illustrates an example of a process procedure of an operation of the power conversion device 100.

The control circuit 300 of the motor drive unit 400 may detect a rotational speed of the motor 200 using various known methods (Step S100). The control circuit 300 determines whether the rotational speed of the motor 200 is a low speed or high speed on the basis of the T-N curve, for example (Step S200). When it is determined that the motor 200 is driven at a low speed, the control circuit 300 selects the first operation mode as the power conversion mode (Step S300), and when it is determined that the motor 200 is driven at a high speed, the control circuit 300 selects the second operation mode as the power conversion mode (Step S400). The control circuit 300 drives the motor 200 by controlling the first and second inverters on the basis of the selected operation mode (Step S500). Hereinafter, Steps S300 to S500 will be described in detail.

Hereinafter, a first operation mode will be described. When the motor 200 is driven at a low speed, in the first inverter 120, neutral point of the windings of each phase are formed at a connection node N1 (see FIG. 1) between the switching circuit 110 and the first inverter 120. In the present specification, the fact that a certain node serves as a neutral point is expressed as "a neutral point is configured." The power conversion device 100 may drive the motor 200 by performing power conversion using the second inverter 130 and the neutral point.

The control circuit 300 turns on the FETs 121H, 122H, and 123H and turns off the FETs 121L, 122L, and 123L in the first inverter 120. As a result, the connection node N1 on the high side serves as a neutral point N1. In other words, in the first inverter 120, the neutral point N1 is configured on the high side. The control circuit 300 also turns off the FET 111. As a result, the electrical connection between the power supply 101 and the first inverter 120 is interrupted, and it is possible to avoid drawing of the current from the power supply 101 to the first inverter 120 via the node N1.

Figure 6:
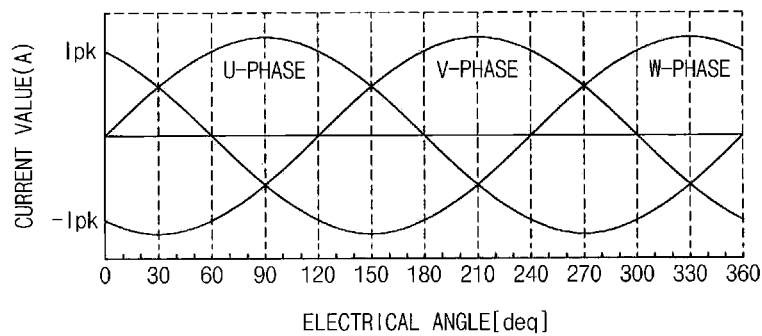
FIG. 6 is a graph illustrating a current waveform obtained by plotting current values flowing through U-phase, V-phase, and W-phase windings of a motor 200 when the power conversion device 100 is controlled in a first operation mode.
Figure 7:
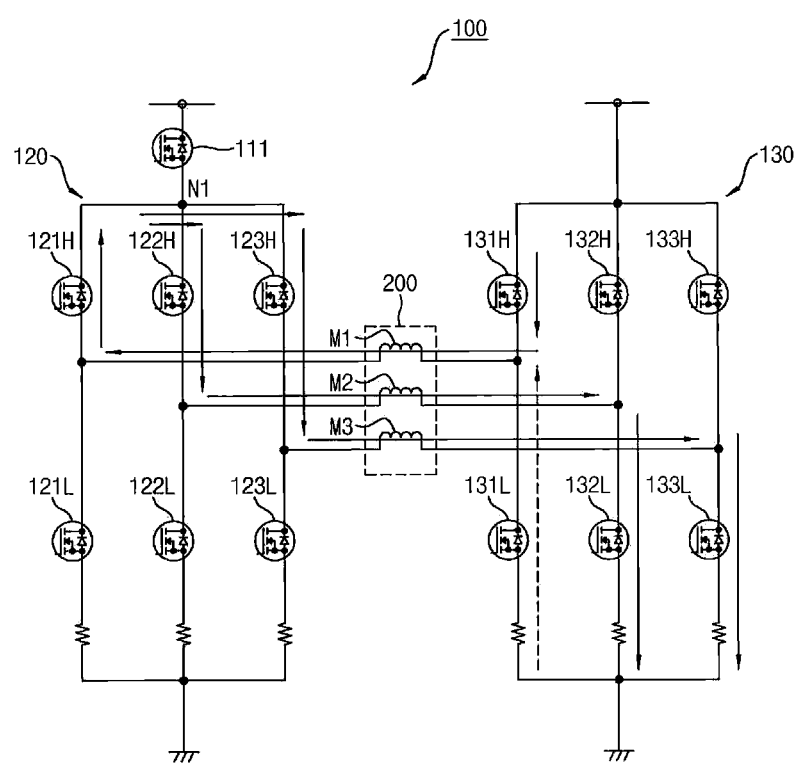
FIG. 7 is a schematic diagram illustrating the flow of current in the power conversion device 100 in the first operation mode.

FIG. 6 illustrates a current waveform (sine wave) obtained by plotting current values flowing through the U-phase, V-phase, and W-phase windings of the motor 200 when the power conversion device 100 is controlled in the first operation mode. The horizontal axis indicates a motor electrical angle (deg), and the vertical axis indicates a current value (A). In the current waveform in FIG. 6, the current value is plotted every electrical angle of 30 degrees. In addition to using the sine wave exemplified in FIG. 6, it is possible to drive the motor 200 using a square wave, for example. $I_{pk}$ in FIG. 6 represents the maximum current value (peak current value) of each phase. FIG. 7 schematically illustrates the flow of current in the power conversion device 100 in the first operation mode. In FIG. 7, for example, a current flow at a motor electrical angle of 270 degrees is illustrated. Each of the three solid lines represents a current flowing from the power supply 101 to the motor 200, and a broken line represents a regenerative current returning to the winding M1 of the motor 200.

In the state illustrated in FIG. 7, in the first inverter 120, the FETs 121H, 122H, and 123H are in the on-state, and the FETs 121L, 122L, and 123L are in the off-state. In the second inverter 130, the FETs 131H, 132L, and 133L are in the on-state, and the FETs 131L, 132H, and 133H are in the off-state.

The current flowing through the FET 131H of the second inverter 130 flows to the neutral point N1 via the winding M1 and the FET 121H of the first inverter 120. A part of the current flows to the winding M2 via the FET 122H, and the remaining current flows to the winding M3 via the FET 123H. The current flowing through the windings M2 and M3 returns to the second inverter 130 and flows to the GND. Also, in the freewheeling diode of the FET 131L, the regenerative current flows toward the winding M1 of the motor 200.

Table 1 exemplifies current values flowing to the terminal of the second inverter 130 for each electrical angle in the current waveform in FIG. 6. Specifically, Table 1 exemplifies a current value at every electrical angle of 30 degrees flowing through the terminals U_R, V_R, and W_R of the second inverter 130 (bridge circuit R). Here, regarding the bridge circuit L, the direction of the current flowing from the terminal of the bridge circuit L to the terminal of the bridge circuit R is defined as a positive direction. The current direction illustrated in FIG. 6 is in accordance with the above-described definition. Regarding the bridge circuit R, the direction of the current flowing from the terminal of the bridge circuit R to the terminal of the bridge circuit L is defined as a positive direction. Therefore, a phase difference between the current of the bridge circuit L and the current of the bridge circuit R is 180 degrees. In Table 1, the magnitude of the current value $I_1$ is $[(3)^{1/2}/2]*I_{pk}$, and the magnitude of the current value $I_2$ is $I_{pk}/2$. According to the definitions of the current directions, the positive/negative sign of the current value illustrated in FIG. 6 is opposite to that of the current value illustrated in Table 1 (phase difference 180 degrees).

TABLE 1

| | | Electrical degree [deg] | | | | | | | | | | | |
|---|---|---|---|---|---|---|---|---|---|---|---|---|---|
| | | 0 (360) | 30 | 60 | 90 | 120 | 150 | 180 | 210 | 240 | 270 | 300 | 330 |
| Bridge circuit R | U_R phase | 0 | $-I_2$ | $-I_1$ | $-I_{pk}$ | $-I_1$ | $-I_2$ | 0 | $I_2$ | $I_1$ | $I_{pk}$ | $I_1$ | $I_2$ |
| | V_R phase | $I_1$ | $I_{pk}$ | $I_1$ | $I_2$ | 0 | $-I_2$ | $-I_1$ | $-I_{pk}$ | $-I_1$ | $-I_2$ | 0 | $I_2$ |
| | W_R phase | $-I_1$ | $-I_2$ | 0 | $I_2$ | $I_1$ | $I_{pk}$ | $I_1$ | $I_2$ | 0 | $-I_2$ | $-I_1$ | $-I_{pk}$ |

At an electrical angle of 0 degrees, no current flows through the U-phase winding M1. A current having a magnitude $I_1$ flows from the bridge circuit R to the bridge circuit L through the V-phase winding M2, and a current having a magnitude $I_1$ flows from the bridge circuit L to the bridge circuit R through the W-phase winding M3.

At an electrical angle of 30 degrees, a current having a magnitude $I_2$ flows from the bridge circuit L to the bridge circuit R through the U-phase winding M1, a current having a magnitude $I_{pk}$ flows from the bridge circuit R to the bridge circuit L through the V-phase winding M2, and a current having a magnitude $I_2$ flows from the bridge circuit L to the bridge circuit R through the W-phase winding M3.

At an electrical angle of 60 degrees, a current having a magnitude $I_1$ flows from the bridge circuit L to the bridge circuit R through the U-phase winding M1, and a current having a magnitude $I_1$ flows from the bridge circuit R to the bridge circuit L through the V-phase winding M2. No current flows through the W-phase winding M3.

At an electrical angle of 90 degrees, a current having a magnitude $I_{pk}$ flows from the bridge circuit L to the bridge circuit R through the U-phase winding M1, a current having a magnitude $I_2$ flows from the bridge circuit R to the bridge circuit L through the V-phase winding M2, and a current having a magnitude 12 flows from the bridge circuit R to the bridge circuit L through the W-phase winding M3.

At an electrical angle of 120 degrees, a current having a magnitude $I_1$ flows from the bridge circuit L to the bridge circuit R through the U-phase winding M1, and a current having a magnitude $I_1$ flows from the bridge circuit R to the bridge circuit L through the W-phase winding M3. No current flows through the V-phase winding M2.

At an electrical angle of 150 degrees, a current having a magnitude $I_2$ flows from the bridge circuit L to the bridge circuit R through the U-phase winding M1, a current having a magnitude $I_2$ flows from the bridge circuit L to the bridge circuit R through the V-phase winding M2, and a current having a magnitude $I_{pk}$ flows from the bridge circuit R to the bridge circuit L through the W-phase winding M3.

At an electrical angle of 180 degrees, no current flows through the U-phase winding M1. A current having a magnitude $I_1$ flows from the bridge circuit L to the bridge circuit R through the V-phase winding M2, and a current having a magnitude $I_1$ flows from the bridge circuit R to the bridge circuit L through the W-phase winding M3.

At an electrical angle of 210 degrees, a current having a magnitude $I_2$ flows from the bridge circuit R to the bridge circuit L through the U-phase winding M1, a current having a magnitude $I_{pk}$ flows from the bridge circuit L to the bridge circuit R through the V-phase winding M2, and a current having a magnitude $I_2$ flows from the bridge circuit R to the bridge circuit L through the W-phase winding M3.

At an electrical angle of 240 degrees, a current having a magnitude $I_1$ flows from the bridge circuit R to the bridge circuit L through the U-phase winding M1, and a current having a magnitude flows from the bridge circuit L to the bridge circuit R through the V-phase winding M2. No current flows through the W-phase winding M3.

At an electrical angle of 270 degrees, a current having a magnitude $I_{pk}$ flows from the bridge circuit R to the bridge circuit L through the U-phase winding M1, a current having a magnitude $I_2$ flows from the bridge circuit L to the bridge circuit R through the V-phase winding M2, and a current having a magnitude 12 flows from the bridge circuit L to the bridge circuit R through the W-phase winding M3.

At an electrical angle of 300 degrees, a current having a magnitude $I_1$ flows from the bridge circuit R to the bridge circuit L through the U-phase winding M1, and a current having a magnitude flows from the bridge circuit L to the bridge circuit R through the W-phase winding M3. No current flows through the V-phase winding M2.

At an electrical angle of 330 degrees, a current having a magnitude $I_2$ flows from the bridge circuit R to the bridge circuit L through the U-phase winding M1, a current having a magnitude $I_2$ flows from the bridge circuit R to the bridge circuit L through the V-phase winding M2, and a current having a magnitude $I_{pk}$ flows from the bridge circuit L to the bridge circuit R through the W-phase winding M3.

The sum of the current flowing into the neutral point N1 and the current flowing out from the neutral point N1 is always "0" for every electrical angle. For example, the control circuit 300 controls the switching operation of each FET of the bridge circuit R by vector control by which the current waveform illustrated in FIG. 6 is obtained.

Since the power supply 101 and the first inverter 120 are electrically disconnected due to the FET 111 of the switching circuit 110, no current flows from the power supply 101 to the first inverter 120. Also, since all of the low side switching elements 121L, 122L, and 123L are turned off, no current flows to the GND at the first inverter 120 side. As a result, it is possible to suppress power loss, and suitable current control becomes possible by forming a closed loop of a drive current.

Since high torque is required when the motor is driven at a low speed (for example, when the vehicle is being parked), a large current flows through the inverter. In other words, a switching element capable of flowing a large current, that is, a switching element having a large current capacity is required. Power loss of such a switching element (including loss due to the switching operation) inevitably increases. Also, since it is extremely difficult to use general-purpose products for the switching element having a large current capacity, a custom-made item is required in many cases.

In a case in which two inverters are used as in the power conversion device of the present disclosure, numerous switching elements having a large current capacity are required. Therefore, there are problems in that the cost of parts inevitably increases and the overall power loss of the two inverters further increases. For example, the motor drive unit 400 may be modularized as a power pack. In that case, heat generated due to power consumption by the FETs of the inverters is transferred to the power pack, and heat generation of the power pack may be a problem in some cases. To solve such a problem, during low speed driving, for example, it is desirable to reduce the number of FETs performing the switching operation and use FETs with smaller current capacity as much as possible.

According to the first operation mode according to the present preferred embodiment, during low speed driving, a switching operation of each FET occurs in the second inverter 130, and a switching operation of each FET does not occur in the first inverter 120. Also, no current flows through the low side switching elements 121L, 122L, and 123L which are in an off-state. Power loss due to switching operation occurs mostly in the second inverter 130. Also, like each switching element of the second inverter 130, switching elements having the second current capacity that are capable of withstanding a large current are used as the high side switching elements 121H, 122H, and 123H which are in an on-state. As a result, since the first inverter 120 can be driven while a large load is applied by the second inverter 130 having the switching elements having the second current capacity, the loads of the FETs of the two inverters can be leveled.

Figure 8:
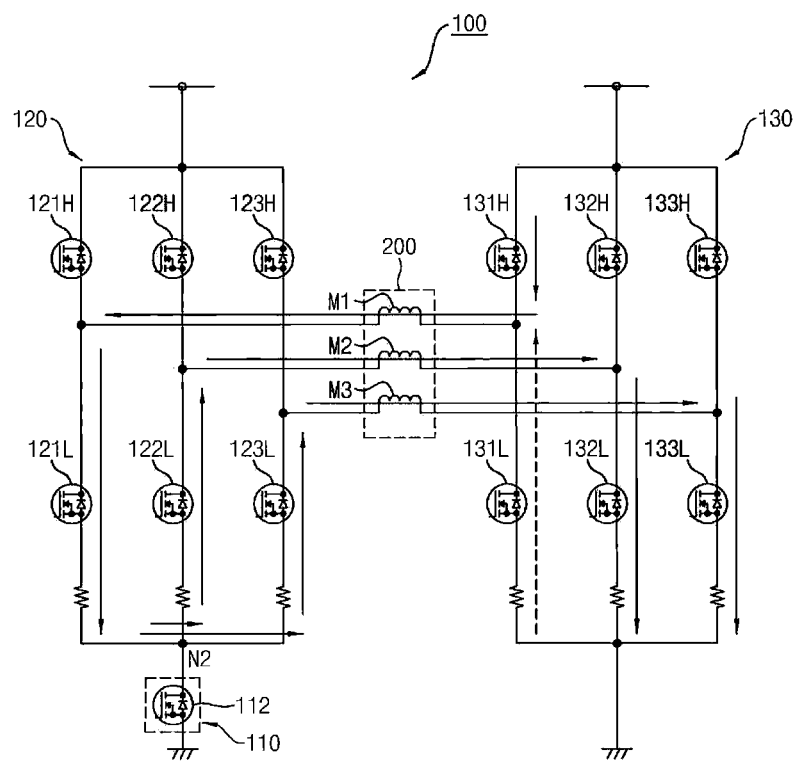
FIG. 8 is a circuit diagram illustrating a circuit configuration of the power conversion device 100 in which a switching circuit 110 is disposed on a GND side of a first inverter 120.

FIG. 8 schematically illustrates a circuit configuration of the power conversion device 100 in which the switching circuit 110 is disposed at the GND side of the first inverter 120. As illustrated, the switching circuit 110 may be disposed between the first inverter 120 and the GND. The switching circuit 110 has a second switch element 112. In the present specification, the switching circuit 110 disposed at the GND side is referred to as "GND-side switching circuit" in some cases. The switching circuit 110 switches whether the first inverter 120 and the GND are connected or disconnected.

In this configuration example, the switching elements 121L, 122L, and 123L in the first inverter 120 are FETs having the second current capacity. A current capacity of low side switching elements at the side at which the switching circuit 110 is disposed is set to be the second current capacity which is the same as that of the second inverter 130. The switching elements 121H, 122H, and 123H in the first inverter 120 are FETs having the first current capacity.

The control circuit 300 turns on the FETs 121L, 122L, and 123L and turns off the FETs 121H, 122H, and 123H in the first inverter 120. As a result, a connection node N2 at the low side serves as a neutral point N2. In other words, in the first inverter 120, the neutral point N2 is configured at the low side. Also, the control circuit 300 turns off the FET 112 of the switching circuit 110. As a result, the electrical connection between the first inverter 120 and the GND is interrupted, and it is possible to prevent the flow of current from the first inverter 120 to the GND via the node N2.

For example, the control circuit 300 controls the switching operation of each FET of the bridge circuit R by vector control by which the current waveform illustrated in FIG. 6 is obtained. As a result, the power conversion device 100 may drive the motor 200 by using the second inverter 130 and the neutral point N2 at the low side of the first inverter 120.

In FIG. 8, for example, a current flow at a motor electrical angle of 270 degrees is illustrated. Each of the three solid lines represents a current flowing from the power supply 101 to the motor 200, and a broken line represents a regenerative current returning to the winding M1 of the motor 200. In the first inverter 120, the FETs 121H, 122H, and 123H are in an off-state, and the FETs 121L, 122L, and 123L are in an on-state. In the second inverter 130, the FETs 131H, 132L, and 133L are in an on-state, and the FETs 131L, 132H, and 133H are in an off-state.

The current flowing through the FET 131H of the second inverter 130 flows to the neutral point N2 via the winding M1 and the FET 121L of the first inverter 120. A part of the current flows to the winding M2 via the FET 122L, and the remaining current flows to the winding M3 via the FET 123L. The current flowing through the windings M2 and M3 returns to the second inverter 130 and flows to the GND. Also, in the freewheeling diode of the FET 131L, the regenerative current flows toward the winding M1 of the motor 200.

Power loss can be suppressed even when the GND-side switching circuit is used instead of the power-supply-side switching circuit, and suitable current control becomes possible by forming a closed loop of a drive current. In addition, for example, it is possible to improve countermeasures for the above-described heat generation of the power pack.

According to the power conversion device of the present disclosure, regarding the circuit configuration illustrated in FIG. 1, for example, the current capacity of the high side switching elements of the first inverter 120 may be set to be a third current capacity, the current capacity of the low side switching elements of the first inverter 120 may be set to be the first current capacity, and the current capacity of the low side switching elements and the high side switching elements of the second inverter 130 may be set to be the second current capacity. The third current capacity is larger than the first current capacity and smaller than the second current capacity. For example, it is possible to set the first current capacity to 50 A, the second current capacity to 100 A, and the third current capacity to 70 A. The ratio of the first, second, and third current capacities may be, for example, 5:10:7.

In this way, by further using the FETs having the third current capacity, it is possible to drive the first inverter 120 while applying a larger load to the second inverter 130 having the switching elements having the second current capacity, and it is possible to suppress the element size and cost of the FET for the high side switching elements of the first inverter 120.

Hereinafter, a second operation mode will be described. When the motor 200 is driven at a high speed, the power conversion device 100 may drive the motor 200 by performing power conversion using both the first and second inverters 120 and 130.

Refer back to FIG. 7.

The control circuit 300 turns on the FET 111 of the switching circuit 110. As a result, the power supply 101 and the first inverter 120 are electrically connected. In the connection state, the control circuit 300 drives the motor 200 by performing three-phase energization control using both the first and second inverters 120 and 130. Three-phase energization control refers to performing switching control of the FETs of the first inverter 120 and the FETs of the second inverter 130 with opposite phases (phase difference=180 degrees). For example, focusing on the H bridge including the FETs 121L, 121H, 131L, and 131H, the FET 131L is turned off when the FET 121L is turned on, and the FET 131L is turned on when the FET 121L is turned off. Likewise, the FET 131H is turned off when the FET 121H is turned on, and the FET 131H is turned on when the FET 121H is turned off.

Figure 9:
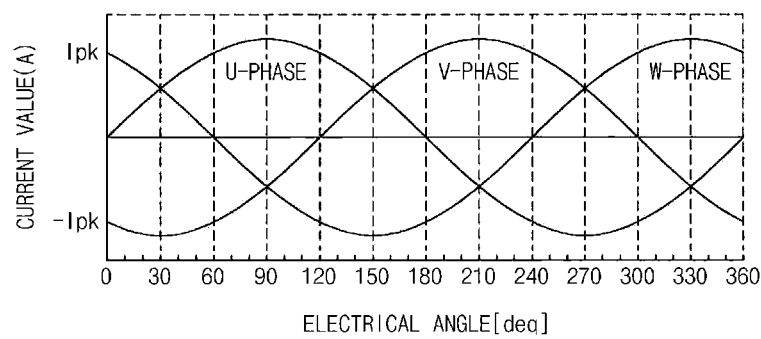
FIG. 9 is a graph illustrating a current waveform obtained by plotting current values flowing through U-phase, V-phase, and W-phase windings of the motor 200 when the power conversion device 100 is controlled according to three-phase energization control.

FIG. 9 exemplifies a current waveform obtained by plotting current values flowing through the U-phase, V-phase, and W-phase windings of the motor 200 when the power conversion device 100 is controlled according to the three-phase energization control. The horizontal axis indicates a motor electrical angle (deg), and the vertical axis indicates a current value (A). In the current waveform in FIG. 9, the current value is plotted every electrical angle of 30 degrees. In addition to using the sine wave exemplified in FIG. 9, it is possible to drive the motor 200 using a square wave, for example.

Table 2 shows current values flowing to the terminals of each inverter for each electrical angle in the sine wave in FIG. 9. Specifically, Table 2 exemplifies a current value at every electrical angle of 30 degrees flowing through the terminals U_L, V_L, and W_L of the first inverter 120 (bridge circuit L) and a current value at every electrical angle of 30 degrees flowing through the terminals U_R, V_R, and W_R of the second inverter 130 (bridge circuit R). The definitions of the current directions are the same as those described above.

TABLE 2

| | | Electrical degree [deg] | | | | | | | | | | |
|---|---|---|---|---|---|---|---|---|---|---|---|---|
| | | 0 (360) | 30 | 60 | 90 | 120 | 150 | 180 | 210 | 240 | 270 | 300 | 330 |
| Bridge circuit L | U_L phase | 0 | $I_2$ | $I_1$ | $I_{pk}$ | $I_1$ | $I_2$ | 0 | $-I_2$ | $-I_1$ | $-I_{pk}$ | $-I_1$ | $-I_2$ |
| | V_L phase | $-I_1$ | $-I_{pk}$ | $-I_1$ | $-I_2$ | 0 | $I_2$ | $I_1$ | $I_{pk}$ | $I_1$ | $I_2$ | 0 | $-I_2$ |
| | W_L phase | $I_1$ | $I_2$ | 0 | $-I_2$ | $-I_1$ | $-I_{pk}$ | $-I_1$ | $-I_2$ | 0 | $I_2$ | $I_1$ | $I_{pk}$ |
| Bridge circuit R | U_R phase | 0 | $-I_2$ | $-I_1$ | $-I_{pk}$ | $-I_1$ | $-I_2$ | 0 | $I_2$ | $I_1$ | $I_{pk}$ | $I_1$ | $I_2$ |
| | V_R phase | $I_1$ | $I_{pk}$ | $I_1$ | $I_2$ | 0 | $-I_2$ | $-I_1$ | $-I_{pk}$ | $-I_1$ | $-I_2$ | 0 | $I_2$ |
| | W_R phase | $-I_1$ | $-I_2$ | 0 | $I_2$ | $I_1$ | $I_{pk}$ | $I_1$ | $I_2$ | 0 | $-I_2$ | $-I_1$ | $-I_{pk}$ |

For example, at an electrical angle of 30 degrees, a current having a magnitude $I_2$ flows from the bridge circuit L to the bridge circuit R through the U-phase winding M1, a current having a magnitude $I_{pk}$ flows from the bridge circuit R to the bridge circuit L through the V-phase winding M2, and a current having a magnitude $I_2$ flows from the bridge circuit L to the bridge circuit R through the W-phase winding M3. At an electrical angle of 60 degrees, a current having a magnitude $I_1$ flows from the bridge circuit L to the bridge circuit R through the U-phase winding M1, and a current having a magnitude $I_1$ flows from the bridge circuit R to the bridge circuit L through the V-phase winding M2. No current flows through the W-phase winding M3. In the three-phase energization control, the sum of the currents flowing through the three-phase windings which takes the current directions into consideration is always "0" for every electrical angle. For example, the control circuit 300 controls the switching operation of each FET of the bridge circuits L and R by the three-phase energization control by using vector control by which the current waveform illustrated in FIG. 9 is obtained.

As shown in Tables 1 and 2, it can be seen that the motor current flowing through the motor 200 between the first and second operation modes does not change for every electrical angle. In other words, the assist torque of the motor does not change between the two modes.

A large counter electromotive force is generated in the motor when the motor is driven at a high speed (for example, when the vehicle travels at a high speed). Therefore, it is necessary to increase the voltage of each phase. According to the second operation mode, during high speed driving, the power conversion device 100 may perform the three-phase energization control by using both the first and second inverters 120 and 130. As a result, it is possible to increase the voltage of each phase, thereby causing an expansion of the range of high-speed driving.

When the motor is driven at a high speed, a large current is not required as much as when the motor is driven at a low speed. Therefore, in the present preferred embodiment, the current capacity of the FETs 121L, 122L, and 123L of the first inverter 120, which contributes to the switching operation only when the motor is driven at a high speed, is set to be the first current capacity which is smaller than the second current capacity that allows a current required when the motor is driven at a high speed.

According to the power conversion device of the present disclosure, at least one of the low side switching elements and the high side switching elements in the first inverter 120 may be a switching element having the first current capacity.

For example, in a case in which the power-supply-side switching circuit illustrated in FIG. 1 is installed, the FET 121L of the first inverter 120 may be an FET having the first current capacity, and the FETs 122L and 123L may be FETs having the second current capacity. According to this configuration, an effect of suppressing power loss, size, and cost of at least one switching element (FET 121L) is expected.

According to the present preferred embodiment, it is possible to cause efficient driving of the motor 200 while suppressing power loss due to the inverters over a wide range from low-speed driving to high-speed driving.

Figure 10:
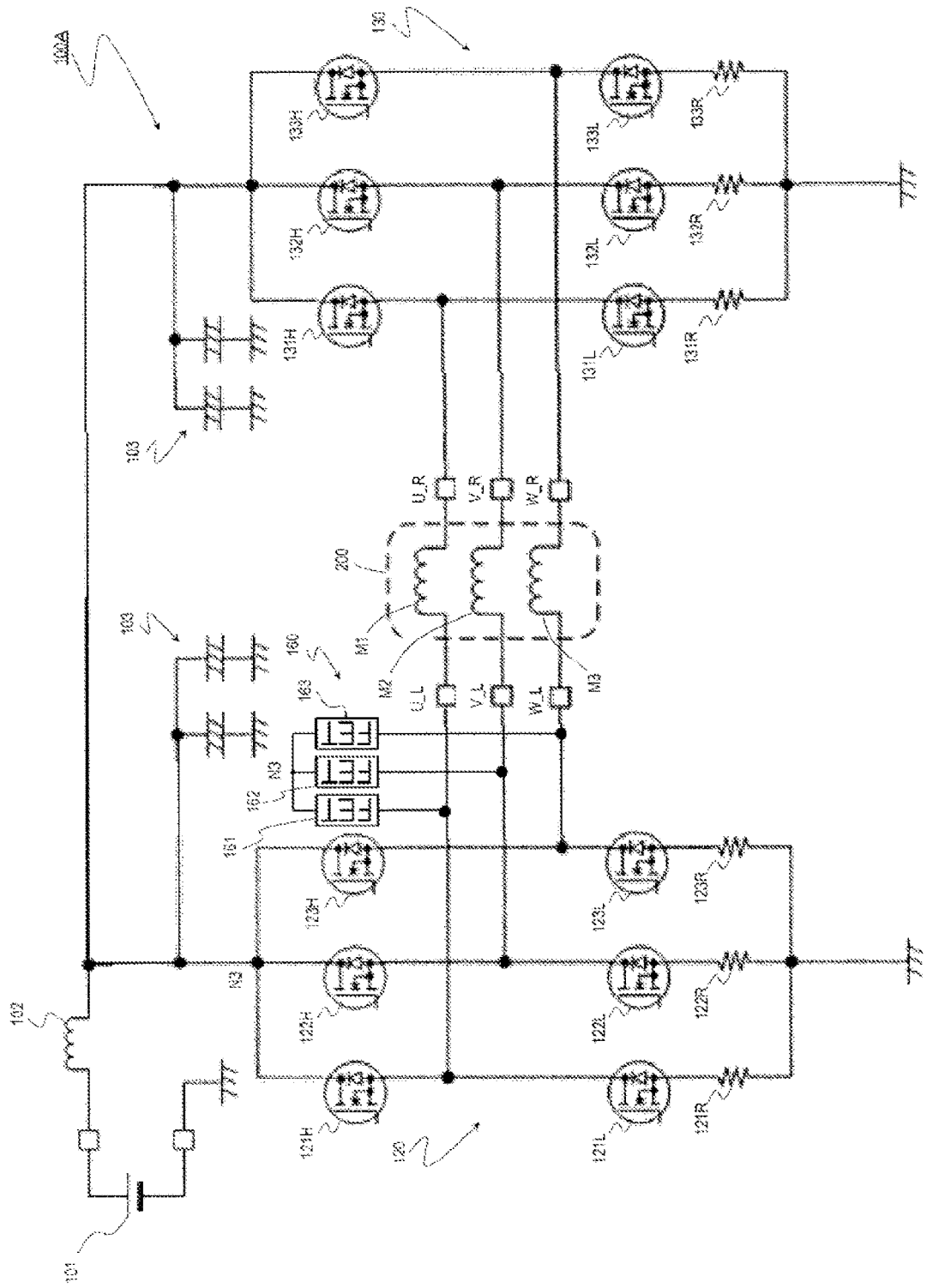
FIG. 10 is a circuit diagram illustrating a circuit configuration of a power conversion device 100A according to a second preferred embodiment of the present invention.
Figure 11:
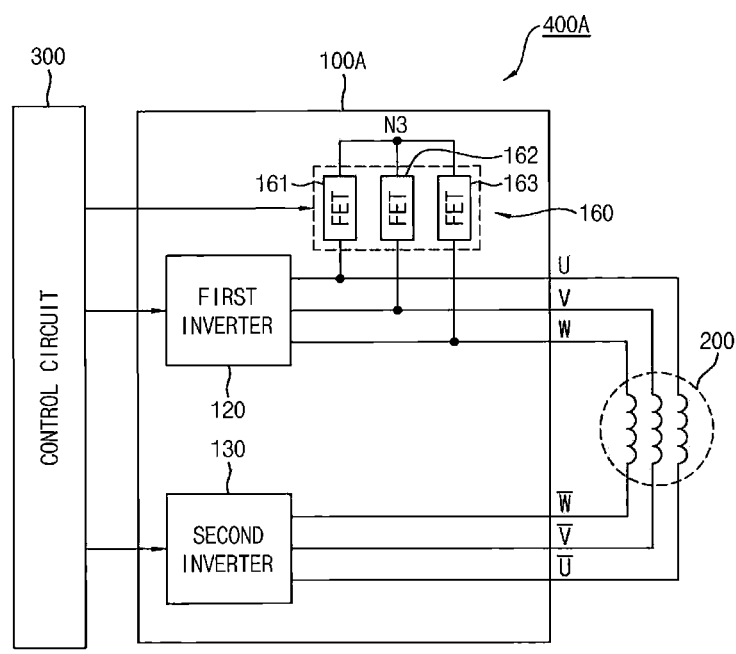
FIG. 11 is a block diagram illustrating a typical block configuration of a motor driver 400A according to the second preferred embodiment of the present invention.

FIG. 10 schematically illustrates a circuit configuration of the power conversion device 100A according to the present preferred embodiment. FIG. 11 schematically illustrates a typical block configuration of a motor drive unit 400A having the power conversion device 100A.

The power conversion device 100A has a neutral point relay circuit 160 as a switching circuit. Hereinafter, differences from the power conversion device 100 according to the first preferred embodiment will be mainly described.

The neutral point relay circuit 160 is disposed at the first inverter 120 side and is connected to one end of the windings of each phase. The neutral point relay circuit 160 has three first neutral point relays 161, 162, and 163 each having one end connected to a common node N3 and the other end connected to the one end of the windings of each phase. Specifically, one end of the first neutral point relay 161 is connected to the node N3, and the other end thereof is connected to one end of the U-phase winding M1. One end of the first neutral point relay 162 is connected to the node N3, and the other end thereof is connected to one end of the V-phase winding M2. One end of the first neutral point relay 163 is connected to the node N3, and the other end thereof is connected to one end of the W-phase winding M3. By this circuit configuration, the neutral point relay circuit 160 may switch whether the one ends of the windings of each phase are connected or disconnected.

The on and off of the first neutral point relays 161, 162, and 163 may be controlled by, for example, the control circuit 300. As the relays, for example, a transistor such as an FET or an IGBT may be widely used. A mechanical relay may also be used as the relays. In the present specification, an example in which the FETs are used as the relays will be described, and each relay will be referred to as the FET in the following description.

In the present specification, an on-state of the neutral point relay circuit 160 refers to a state in which all of the FETs 161, 162, and 163 are turned on, and an off-state of the neutral point relay circuit 160 refers to a state in which all of the FETs 161, 162, and 163 are turned off.

In the present preferred embodiment, all of the switching elements 121H, 122H, 123H, 121L, 122L, and 123L in the first inverter 120 are FETs having the first current capacity. All of the switching elements 13H, 132H, 133H, 131L, 132L, and 133L in the second inverter 130 are FETs having the second current capacity.

Hereinafter, a specific example of the operation of the motor drive unit 400 will be described, and a specific example of the operation of the power conversion device 100A will be mainly described.

Like the power conversion device 100 according to the first preferred embodiment, the power conversion device 100A has power conversion modes including first and second operation modes. For example, according to the procedure illustrated in FIG. 5, the control circuit 300 selects the first operation mode as a power conversion mode when it is determined that the motor 200 is being driven at a low speed and selects the second operation mode as a power conversion mode when it is determined that the motor 200 is being driven at a high speed. The control circuit 300 drives the motor 200 by controlling the first and second inverters on the basis of the selected operation mode.

Hereinafter, a first operation mode will be described. When the motor 200 is driven at a low speed, a neutral point N3 of the windings of each phase is configured at the connection node N3 in the neutral point relay circuit 160 (see FIG. 10). The control circuit 300 turns on the neutral point relay circuit 160 and turns off all of the low side switching elements and the high side switching elements of the first inverter 120. As a result, no current flows through the first inverter 120. For example, a current flowing through the winding M1 via the FET 131H of the second inverter 130 flows to the neutral point N3 via the FET 161 of the neutral point relay circuit 160. A part of the current flows to the winding M2 via the FET 162, and the remaining current flows to the winding M3 via the FET 163. The current flowing through the windings M2 and M3 returns to the second inverter 130 and flows to the GND.

For example, the control circuit 300 controls the switching operation of each FET of the bridge circuit R by vector control by which the current waveform illustrated in FIG. 6 is obtained. As a result, the power conversion device 100A may drive the motor 200 by performing power conversion using the second inverter 130 and the neutral point N3.

Hereinafter, a second operation mode will be described. The control circuit 300 turns off the neutral point relay circuit 160. As a result, no current flows through the neutral point relay circuit 160. The power conversion device 100 may drive the motor 200 by performing three-phase energization control using both the first and second inverters 120 and 130.

According to the present preferred embodiment, during low speed driving, no current flows through the FETs of the first inverter 120. In other words, none of the FETs perform the switching operation. Therefore, power consumption by the first inverter 120 is suppressed, and as a result, power loss of the overall power conversion device 100A may be suppressed. In this way, since the first inverter 120 can be driven while a large load is applied by the second inverter 130 having the switching elements having the second current capacity, the loads of the FETs of the two inverters can be leveled.

As in the first preferred embodiment, by setting the current capacity of all of the FETs of the first inverter 120 to be the first current capacity smaller than the second current capacity that allows a current required when the motor is driven at a high speed, power loss in the first inverter 120 during high speed driving can be effectively suppressed.

According to the present preferred embodiment, it is possible to cause efficient driving of the motor 200 while suppressing power loss due to the inverters over a wide range from low-speed driving to high-speed driving.

A power conversion device 100B according to the present preferred embodiment is different from the power conversion device 100 according to the first preferred embodiment in that the power conversion device 100B has a power-supply-side switching circuit and a GND-side switching circuit for the first inverter 120. Hereinafter, differences from the power conversion device 100 according to the first preferred embodiment will be mainly described.

Figure 12:
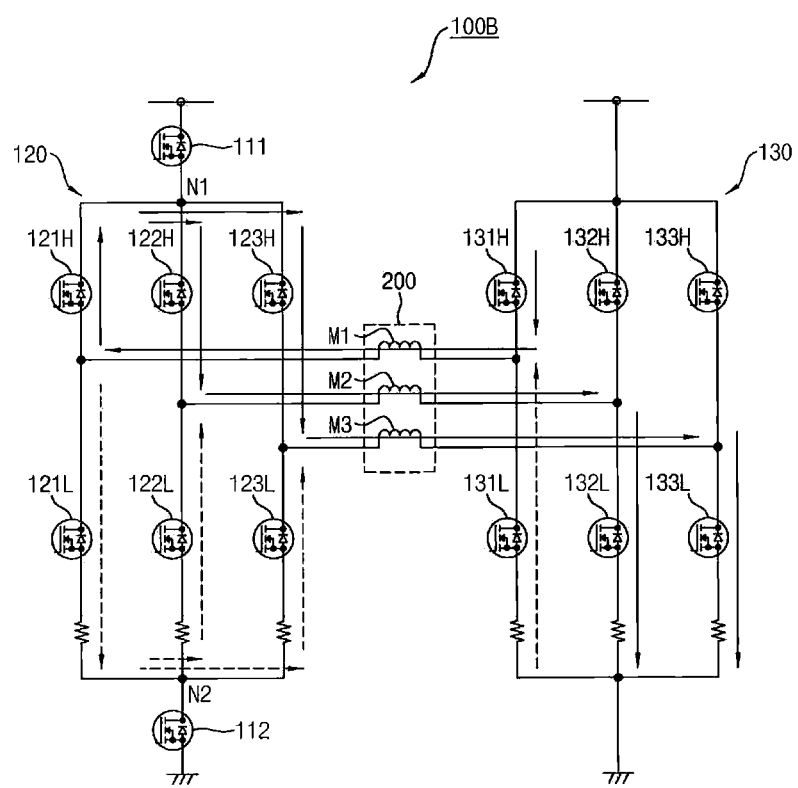
FIG. 12 is a circuit diagram illustrating a circuit configuration of a power conversion device 100B according to a third preferred embodiment of the present invention.

FIG. 12 schematically illustrates a circuit configuration of the power conversion device 100B according to the present preferred embodiment.

The power conversion device 100B has a switching circuit 110 including FETs 111 and 112 for the first inverter 120.

Like the power conversion device 100 according to the first preferred embodiment, the power conversion device 100B has power conversion modes including first and second operation modes. The control circuit 300 (see FIG. 3) selects the first operation mode as a power conversion mode when it is determined that the motor 200 is being driven at a low speed and selects the second operation mode as a power conversion mode when it is determined that the motor 200 is being driven at a high speed.

When the motor 200 is driven at a low speed, during the first operation mode, the control circuit 300 turns off the FETs 111 and 112 and turns on all of the high side switching elements and low side switching elements of the first inverter 120. As a result, as illustrated in FIG. 12, the neutral point N1 is configured at the high side of the first inverter, and the neutral point N2 is configured at the low side thereof. The power conversion device 100B drives the motor 200 by performing power conversion using the second inverter 130 and the two neutral points N1 and N2 of the first inverter 120.

During the second operation mode, the control circuit 300 turns on the FETs 111 and 112 and performs power conversion by the three-phase energization control using the first and second inverters 120 and 130.

According to the present preferred embodiment, as illustrated in FIG. 12, the current may be dispersed to the high side and the low side by the two neutral points N1 and N2. By eliminating power loss due to the switching operation of the FET in the first inverter 120, it is possible to reduce power loss due to energization resistance of all of the FETs in the two inverters. Further, since the current is dispersed to the high side and the low side, an FET having the second current capacity is not required for each FET of the first inverter 120, and an FET having the first current capacity can be selected as each FET of the first inverter 120. As a result, the size and cost of the first inverter 120 can be reduced.

Generally, vehicles such as an automobile have an electric power steering device. An electric power steering device generates auxiliary torque for assisting a steering torque of a steering system generated by a driver operating a steering handle. The auxiliary torque is generated by an auxiliary torque mechanism so that a burden on the driver's operation is reduced. For example, the auxiliary torque mechanism includes a steering torque sensor, an ECU, a motor, a deceleration mechanism, and the like. The steering torque sensor detects steering torque in the steering system. The ECU generates a driving signal on the basis of a detection signal of the steering torque sensor. The motor generates auxiliary torque according to the steering torque on the basis of the driving signal and transmits the auxiliary torque to the steering system via the deceleration mechanism.

Figure 13:
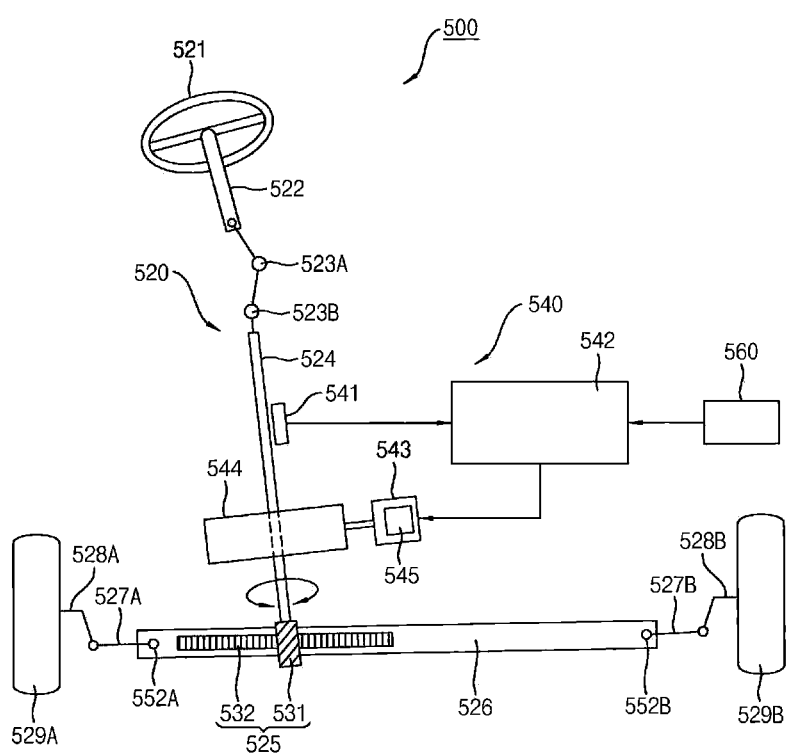
FIG. 13 is a schematic diagram illustrating a typical configuration of an electric power steering device 500 according to a fourth preferred embodiment of the present invention.

The motor drive unit 400 of the present disclosure is suitably used in an electric power steering device. FIG. 13 schematically illustrates a typical configuration of an electric power steering device 500 according to the present preferred embodiment. The electric power steering device 500 has a steering system 520 and an auxiliary torque mechanism 540.

For example, the steering system 520 may include a steering handle 521, a steering shaft 522 (also referred to as "steering column"), universal joints 523A and 523B, a rotation shaft 524 (also referred to as "pinion shaft" or "input shaft"), a rack-and-pinion mechanism 525, a rack shaft 526, left and right ball joints 552A and 552B, tie rods 527A and 527B, knuckles 528A and 528B, and left and right steering wheels (for example, left and right front wheels) 529A and 529B. The steering handle 521 is connected to the rotation shaft 524 via the steering shaft 522 and the universal joints 523A and 523B. The rack shaft 526 is connected to the rotation shaft 524 via the rack-and-pinion mechanism 525. The rack-and-pinion mechanism 525 has a pinion 531 installed at the rotation shaft 524 and a rack 532 installed at the rack shaft 526. To a right end of the rack shaft 526, a right steering wheel 529A is connected via the ball joint 552A, the tie rod 527A, and the knuckle 528A in this order. Like the right side, a left steering wheel 529B is connected to a left end of the rack shaft 526 via the ball joint 552B, the tie rod 527B, and the knuckle 528B in this order. Here, the right side and the left side respectively correspond to the right side and the left side seen from the driver sitting on a seat.

According to the steering system 520, steering torque is generated by the driver operating the steering handle 521, and the steering torque is transmitted to the left and right steering wheels 529A and 529B via the rack-and-pinion mechanism 525. As a result, the driver may operate the left and right steering wheels 529A and 529B.

For example, the auxiliary torque mechanism 540 may include a steering torque sensor 541, an ECU 542, a motor 543, a deceleration mechanism 544, and a power conversion device 545. The auxiliary torque mechanism 540 gives auxiliary torque to the steering system 520 ranging from the steering handle 521 to the left and right steering wheels 529A and 529B. The auxiliary torque is referred to as "additional torque" in some cases.

The control circuit 300 according to the present disclosure may be used as the ECU 542, and the power conversion device 100 according to the present disclosure may be used as the power conversion device 545. Also, the motor 543 corresponds to the motor 200 in the present disclosure. The motor drive unit 400 according to the present disclosure may be suitably used as an electromechanically integrated motor capable of being configured by the ECU 542, the motor 543, and the power conversion device 545.

The steering torque sensor 541 detects steering torque of the steering system 520 applied by the steering handle 521. The ECU 542 generates a driving signal for driving the motor 543 on the basis of a detection signal (hereinafter referred to as "torque signal") from the steering torque sensor 541. The motor 543 generates auxiliary torque according to the steering torque on the basis of the driving signal. The auxiliary torque is transmitted to the rotation shaft 524 of the steering system 520 via the deceleration mechanism 544. For example, the deceleration mechanism 544 is a worm gear mechanism. The auxiliary torque is also transmitted from the rotation shaft 524 to the rack-and-pinion mechanism 525.

The electric power steering device 500 may be classified into a pinion assist type, a rack assist type, a column assist type, and the like depending on a place where the auxiliary torque is applied to the steering system 520. FIG. 13 illustrates a pinion assist type electric power steering device 500. However, the electric power steering device 500 is also applied to a rack assist type, a column assist type, and the like.

For example, in addition to the torque signal, a vehicle speed signal may also be input to the ECU 542. An external device 560 is, for example, a vehicle speed sensor. Alternatively, for example, the external device 560 may be another ECU capable of communicating via an in-vehicle network such as a controller area network (CAN). A microcontroller of the ECU 542 may perform vector control or PWM control of the motor 543 on the basis of the torque signal, the vehicle speed signal, and the like.

The ECU 542 sets a target current value on the basis of at least the torque signal. It is desirable that the ECU 542 sets a target current value by taking into consideration a vehicle speed signal detected by a vehicle speed sensor and a rotation signal of a rotor detected by an angle sensor. The ECU 542 may control a driving signal, that is, a drive current, of the motor 543 so that an actual current value detected by a current sensor (not illustrated) corresponds to the target current value.

According to the electric power steering device 500, by using combined torque obtained by adding the auxiliary torque of the motor 543 to the steering torque of the driver, the left and right steering wheels 529A and 529B may be operated by the rack shaft 526. Particularly, by using the motor drive unit 400 of the present disclosure as the above-described electromechanically integrated motor, an electric power steering device having a motor drive unit capable of improving countermeasures for heat generation and performing suitable current control is provided.

Embodiments of the present disclosure can be widely used in various devices having various motors such as a vacuum cleaner, a dryer, a ceiling fan, a washing machine, a refrigerator, and an electric power steering device.

Features of the above-described preferred embodiments and the modifications thereof may be combined appropriately as long as no conflict arises.

While preferred embodiments of the present disclosure have been described above, it is to be understood that variations and modifications will be apparent to those skilled in the art without departing from the scope and spirit of the present disclosure. The scope of the present disclosure, therefore, is to be determined solely by the following claims.

What is claimed is:

1. A power conversion device that converts power from a power supply to power to be supplied to a motor with n-phase windings, where n is an integer of 3 or greater, the power conversion device comprising:
a first inverter connected to first ends of windings of each phase of the motor;
a second inverter connected to second ends of the windings of each phase of the motor; and
a switching circuit used to define a neutral point in the windings of each phase on a side of the first inverter; wherein
at least one of a plurality of switches included in the first inverter has a first maximum drain current tolerance capacity;
a plurality of switches included in the second inverter have a second maximum drain current tolerance capacity that is greater than the first maximum drain current tolerance capacity;
each bridge circuit of the first and second inverters includes n legs each including a low side switch and a high side switch;
the switching circuit is a power-supply-side switching circuit including a first switch to switch whether the first inverter and the power supply are connected or disconnected;
the n low side switches in the bridge circuit of the first inverter have the first maximum drain current tolerance capacity, and the n high side switches in the bridge circuit of the first inverter have the second maximum drain current tolerance capacity; and
the plurality of switches included in the first inverter and the plurality of switches included in the second inverter are operated in accordance with a pulse width modulation signal generated by a control circuit.

2. A power conversion device that converts power from a power supply to power to be supplied to a motor with n-phase windings, where n is an integer of 3 or greater, the power conversion device comprising:
a first inverter connected to first ends of windings of each phase of the motor;
a second inverter connected to second ends of the windings of each phase of the motor; and
a switching circuit used to define a neutral point in the windings of each phase on a side of the first inverter; wherein
at least one of a plurality of switches included in the first inverter has a first maximum drain current tolerance capacity;
a plurality of switches included in the second inverter have a second maximum drain current tolerance capacity that is greater than the first maximum drain current tolerance capacity;
each bridge circuit of the first and second inverters includes n legs each including a low side switch and a high side switch;
the switching circuit is a power-supply-side switching circuit including a first switch to switch whether the first inverter and the power supply are connected or disconnected;
the n low side switches in the bridge circuit of the first inverter have the first maximum drain current tolerance capacity, and the n high side switches in the bridge circuit of the first inverter have a third maximum drain current tolerance capacity that is larger than the first maximum drain current tolerance capacity and smaller than the second maximum drain current tolerance capacity; and
the plurality of switches included in the first inverter and the plurality of switches included in the second inverter are operated in accordance with a pulse width modulation signal generated by a control circuit.

3. A power conversion device that converts power from a power supply to power to be supplied to a motor with n-phase windings, where n is an integer or 3 of greater, the power conversion device comprising:
a first inverter connected to first ends of windings of each phase of the motor;
a second inverter connected to second ends of the windings of each phase of the motor; and
a switching circuit used to define a neutral point in the windings of each phase on a side of the first inverter; wherein
at least one of plurality of switches included in the first inverter has a first maximum drain current tolerance capacity;
a plurality of switches included in the second inverter have a second maximum drain current tolerance capacity that is greater than the first maximum drain current tolerance capacity;
each bridge circuit of the first and second inverters includes n legs each including a low side switch and a high side switch;
the switching circuit is a ground-side switching circuit including a second switch to switch whether the first inverter and a ground are connected or disconnected;
the n low side switches in the bridge circuit of the first inverter have the second maximum drain current tolerance capacity, and the n high side switches in the bridge circuit of the first inverter have the first maximum drain current tolerance capacity; and
the plurality of switches included in the first inverter and the plurality of switches included in the second inverter are operated in accordance with a puke width modulation signal generated by a control circuit.

4. A power conversion device that converts power from a power supply to power to be supplied to a motor with n-phase windings, where n is an integer of 3 or greater, the power conversion device comprising:
a first inverter connected to first ends of windings of each phase of the motor;
a second inverter connected to second ends of the windings of each phase of the motor; and
a switching circuit used to define a neutral point in the windings of each phase on a side of the first inverter; wherein
at least one of a plurality of switches included in the first inverter has a first maximum drain current tolerance capacity;
a plurality of switches included in the second inverter have a second maximum drain current tolerance capacity that is greater than the first maximum drain current tolerance capacity;

each bridge circuit of the first and second inverters includes n legs each including a low side switch and a high side switch;

the switching circuit is a ground-side switching circuit including a second switch to switch whether the first inverter and a ground are connected or disconnected;

the n low side switches in the bridge circuit of the first inverter have a third maximum drain current tolerance capacity that is larger than the first maximum drain current tolerance capacity and smaller than the second maximum drain current tolerance capacity, and then high side switches in the bridge circuit of the first inverter have the first maximum drain current tolerance capacity; and the plurality of switches included in the first inverter and the plurality of switches included in the second inverter are operated in accordance with a pulse width modulation signal generated by a control circuit.

5. The power conversion device according to claim 1, wherein each bridge circuit of the first and second inverters includes n legs each including a low side switch and a high side switch;

the switching circuit is a neutral point relay circuit which is connected to first ends of the windings of each phase and switches whether the first ends of the windings of each phase are connected or disconnected; and the n low side switches and the n high side switches in the bridge circuit of the first inverter have the first maximum drain current tolerance capacity.

6. The power conversion device according to claim 1, wherein each bridge circuit of the first and second inverters includes n legs each including a low side switch and a high side switch;

the switching circuit includes a power-supply-side switching circuit including a first switch to switch whether the first inverter and the power supply are connected or disconnected and a ground-side switching circuit including a second switch to switch whether the first inverter and a ground are connected or disconnected; and the n low side switches and the n high side switches in the bridge circuit of the first inverter have the first maximum drain current tolerance capacity.

7. The power conversion device according to claim 1, wherein the power conversion device includes:

a first operation mode in which power conversion is performed using the second inverter and the neutral point of the windings of each phase at the first inverter side by the switching circuit when the motor is driven at a low speed; and a second operation mode in which power conversion is performed by n-phase energization control of the first and second inverters when the motor is driven at a high speed.

8. The power conversion device according to claim 1, wherein the power conversion device includes:

as a first operation mode in which the first switch of the power-supply-side switching circuit is turned off, and the n high side switches are turned on and the n low side switches are turned off in the bridge circuit of the first inverter, the first operation mode in which power conversion is performed using the second inverter and the neutral point of the windings of each phase at a high side of the first inverter when the motor is driven at a low speed; and as a second operation mode in which the first switch of the power-supply-side switching circuit is turned on, the second operation mode in which power conversion is performed by n-phase energization control of the first and second inverters when the motor is driven at a high speed.

9. The power conversion device according to claim 3, wherein the power conversion device includes:

as a first operation mode in which the second switch of the ground-side switching circuit is turned off, and the n high side switches are turned off and the n low side switches are turned on in the bridge circuit of the first inverter, the first operation mode in which power conversion is performed using the second inverter and the neutral point of the windings of each phase at a low side of the first inverter when the motor is driven at a low speed; and as a second operation mode in which the second switch of the ground-side switching circuit is turned on, the second operation mode in which power conversion is performed by n-phase energization control of the first and second inverters when the motor is driven at a high speed.

10. The power conversion device according to claim 5, wherein the power conversion device includes:

as a first operation mode in which the neutral point relay circuit is turned on, and all of the n low side switches and the n high side switches are turned off in the bridge circuit of the first inverter, the first operation mode in which power conversion is performed using the second inverter and the neutral point of the windings of each phase at the neutral point relay circuit when the motor is driven at a low speed; and as a second operation mode in which the neutral point relay circuit is turned off, the second operation mode in which power conversion is performed by n-phase energization control of the first and second inverters when the motor is driven at a high speed.

11. The power conversion device according to claim 6, wherein the power conversion device includes:

as a first operation mode in which the power-supply-side and ground-side switching circuits are turned off, and all of the n low side switches and the n high side switches are turned on in the bridge circuit of the first inverter, the first operation mode in which power conversion is performed using the second inverter and two neutral points of the windings of each phase at a low side and a high side of the first inverter when the motor is driven at a low speed; and as a second operation mode in which the power-supply-side and ground-side switching circuits are turned on, the second operation mode in which power conversion is performed by n-phase energization control of the first and second inverters when the motor is driven at a high speed.

12. The power conversion device according to claim 1, wherein the power supply is a single power supply.

13. A motor driver comprising:
a motor; and
the power conversion device according to claim 1.

14. An electric power steering device comprising the motor driver according to claim 13.

* * * * *